F. BACHILA.
LEVEL.
APPLICATION FILED FEB. 14, 1921.

1,437,164.

Patented Nov. 28, 1922.

Inventor
Fred Bachila.
By
Attorney

Patented Nov. 28, 1922.

1,437,164

UNITED STATES PATENT OFFICE.

FRED BACHILA, OF WALKERVILLE, ONTARIO, CANADA.

LEVEL.

Application filed February 14, 1921. Serial No. 444,858.

*To all whom it may concern:*

Be it known that I, FRED BACHILA, a Russian subject, residing at Walkerville, in the Province of Ontario, in the Dominion of Canada, have invented certain new and useful Improvements in Levels; and I do hereby declare that the following is a full, clear, and exact description of the same.

The present invention relates to improvements in levels, and its main object is to provide a device of this character, particularly accurate, simple and cheap of construction.

The invention will be readily understood with the aid of the following description and accompanying drawings, in which:—

Like numerals of reference indicate corresponding parts in each figure.

Figure 1:
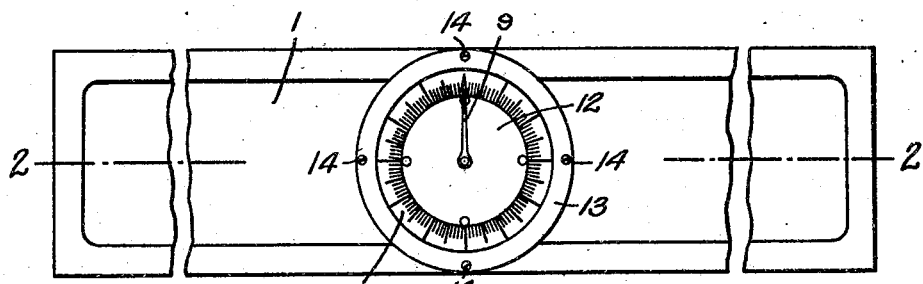
Figure 1 is a side elevation of a level according to the invention.
Figure 2:
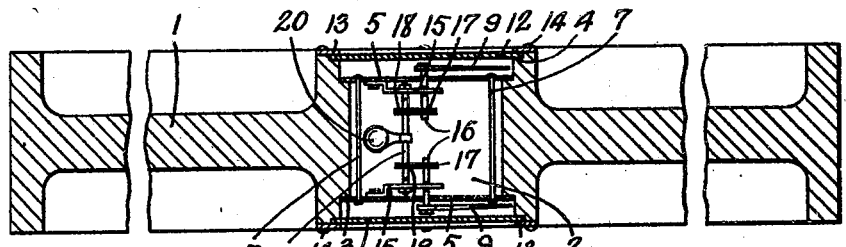
Figure 2 is a longitudinal sectional view on line 2—2 of Figure 1.

Referring to the drawings, 1 is the beam provided centrally with a hole 2 which is enlarged adjacent its outer edges to form the inner and outer shoulders 3 and 4. Against each inner shoulder 3 fits snugly a disk 5 suitably graduated and centrally bored, said disks being secured together by means of the long bolts 7 which project through the hole 2.

Against each shoulder 4 is mounted a circular glass plate 12 maintained in place by the ring 13, which is secured by the screws 14 that engage the sides of the beam 1.

Inside the disks 5 are secured the brackets 15 in which are journalled the stub shafts 16 which carry the pointers 9 and which are disposed in spaced, parallel relation to, but out of alinement with, the main shaft 19. On the inner or free ends of said stub shafts 16 are mounted the pinions 17 which co-act with the gears 18 mounted on the shaft 19 which is also journalled in said brackets 15. Intermediate of said shaft 19 is rigidly secured the pendulum weight 20.

What I claim as my invention is:—

A level, comprising a beam formed with a transverse opening; a dial mounted in said opening adjacent each end thereof and provided with a central opening; a single bracket associated with each dial and secured to the inner face thereof, each bracket having a pair of bearing openings, one of which alines with the central opening in the adjacent dial; a stub shaft journaled in each pair of alining openings and projecting at its outer end through the dial opening; a pointer secured to the projecting end of each stub shaft; a transparent plate arranged at each end of the beam opening exterior to the adjacent dial and pointer; a rock shaft disposed between the two dials in spaced, parallel relation to, but out of alinement with, the stub shafts and journaled at its ends in the other bearing openings in the brackets; a pendulum weight suspended from the central portion of the rock shaft; a gear secured to said rock shaft adjacent each of its ends; and a gear secured to each stub shaft and meshing directly with the adjacent first-named gear, whereby the movements of the rock shaft produced by the rocking of the pendulum weight will be transmitted through the intermeshing gears to the two stub shafts to rotate the latter and their pointers in unison.

Signed at Windsor, Ontario, Canada this twentieth day of January 1921.

FRED BACHILA.

Witnesses:
STENLAY KUPINSKI,
D. A. CHATER.